United States Patent [19]

Oliver

[11] 3,915,896
[45] Oct. 28, 1975

[54] CATALYTIC PROCESS

[75] Inventor: Roger Geoffrey Oliver, Stockton-on-Tees, England

[73] Assignee: Imperial Chemical Industries Limited, London, England

[22] Filed: Aug. 9, 1973

[21] Appl. No.: 386,876

[30] Foreign Application Priority Data
Aug. 18, 1972 United Kingdom............... 38622/72

[52] U.S. Cl................ 252/455 R; 252/472; 252/473
[51] Int. Cl.².......................................... B01J 29/06
[58] Field of Search................ 252/455 R, 472, 473

[56] References Cited
UNITED STATES PATENTS 3,535,228 10/1970 Csicsery et al.............. 252/455 R X
3,637,484 1/1972 Hansford..................... 252/455 R X

*Primary Examiner*—Paul F. Shaver
*Attorney, Agent, or Firm*—Cushman, Darby & Cushman

[57] ABSTRACT

A catalyst for exhaust gas treatment under oxidative or reductive conditions is supported on a refractory compound such as gehlenite in which a basic oxide is in combination with an acidic or amphoteric oxide. The active constituent of the catalyst is one or more platinum group metals.

13 Claims, No Drawings

CATALYTIC PROCESS

This invention relates to a process of treating exhaust gases over a catalyst comprising a platinum group metal, to a catalyst for the process and to a support for the catalyst.

Although catalysts comprising platinum group metals supported on various oxides and oxide-combinations have been used in the chemical industry where processes can be managed to cope with the lack of working life of many of such catalysts, it is now proposed to use such catalysts for the treatment of vehicle exhaust gases, such that they will have to maintain their activity for many years without special care. We have found that with careful attention to preparative details a platinum group metal catalyst of especially long life in exhaust gas treatment can be made.

In its broadest aspect the invention is based on a catalyst support exemplified by gehlenite or a compound isomorphous therewith, whether or not formed in situ on a primary support. The gehlenite or compound isomorphous therewith can have been applied as such to a primary support or be the material of the primary support.

The invention is characterised by a catalyst support comprising a primary catalyst support carrying a secondary catalyst support, the secondary support consisting essentially of one or more involatile acidic and/or amphoteric oxides substantially in combination with one or more basic oxides from Group II, III or IV of the Periodic Table.

The expression "primary support" denotes the material on which the catalyst depends for its mechanical shape and structure. The expression "secondary support" denotes the material with which the catalytically active material is to be intimately associated. The expression "substantially in combination" is intended to include catalysts in which free acidic or amphoteric oxide is present but is not accessible to the active material. Usually it is preferred to have at least 70% by weight of the acidic or amphoteric oxide in combination with basic oxides.

In this specification the composition of solids will be expressed as weight percentages based on the non-volatile materials present. The composition of gases will be in volumes per cent unless otherwise stated. The Periodic Table is as set forth in "Abridgments of Specifications" published by the UK Patent Office.

The acidic or amphoteric oxide of the secondary support can be for example alumina, silica, chromia, manganese oxide or iron oxide or mixtures or compounds thereof. If more than one acidic or amphoteric oxide is present, the combination results in complicated mixed oxides, especially when silica is one of the acidic oxides. Among such mixed oxides aluminosilicates are preferred, on account of the stability of their compounds with basic oxides.

The basic oxide of the secondary support is preferably an oxide of a metal of an A Group of the Periodic Table, especially of Group IIa, especially calcium strontium or barium or more than one of these, most conveniently calcium. Some rare earth oxides are suitable as basic constituents of the combined oxide. It is possible to have some oxide of non-noble catalytic metal combined with acidic and/or amphoteric oxide in the secondary support, but this is usually to be avoided on economic grounds.

The secondary support can be added naturally-occurring mineral or separately made material or the in situ reaction product of precursors or, especially when the primary support contains acidic and/or amphoteric oxides, the in situ reaction product of the added oxide with primary support. Among combined oxides that can be used are melilite (especially gehlenite $Ca_2Al_2SiO_7$ on account of its high melting point and inertness and, less preferably, the isomorphous compounds at intermediate stages to akermanite $Ca_2MgSi_2O_7$, and the higher-melting types of iron melilite), anorthite ($CaO \cdot Al_2O_3 \cdot 2SiO_2$), calcium silicates (such as rankinite, pseudowollastonite and wollastonite $CaO \cdot SiO_2$ and also calcium orthosilicates $CaMSiO_4$ such as monticellites in which M is for example manganese, iron or cobalt) and calcium aluminates (especially those containing at least one molecule of CaO per molecule of $Al_2O_3$). It appears to be preferable to use combined oxides in which the basic oxide is present in a quantity that will give a stoichiometric compound with the acidic or amphoteric oxide considered as a monomeric acid; for example $CaO \cdot Al_2O_3$ is preferred to $CaO \cdot 2Al_2O_3$.

Other oxides, such as those commonly used as catalyst supports, can be present in the secondary support and thus, in a catalyst made therefrom, associated with the active materials, but it is usually found that the combined oxides do not require modification in this way.

The primary support can be in any convenient mechanical shape for example discrete particles (especially rounded granules), fibres or multi-tubular matrices or as a coating on any of such forms or on a metal substrate such as a wire, vessel wall or perforated structure or mesh. The primary support is preferably made of refractory non-metallic, especially oxidic, material and can have been formed for example by casting, moulding, compression, extrusion, wet granulation or prilling in air or oil. If the primary support is a multi-tubular matrix, it can have been formed by moulding, extrusion, coating a convertible template such as aluminum foil or a fugitive template such as paper or cloth or by building-up from simpler shapes. If the primary support is fibrous, it can be made by various spinning and/or blowing procedures, followed if desired by felting, weaving or paper-making or bonding into self-supporting units. Alternatively the primary support can itself be a metal substrate such as described.

When the primary support is a multi-tubular matrix, the cross-sectional shape of the passages in it can be for example triangles, squares, hexagons or the figures bounded by a wave and a straight line or shallow curve. The number of passages per square inch is suitably over 25 and may be as high as 200–600, through 40–500 appears to be the most useful range. The walls between the passages are typically 0.1 to 0.4 mm thick.

When the secondary support is the product of reacting a basic oxide at the surface of the primary support the concentration of alkaline earth metal oxide, free and combined, is suitably 0.5 to 25%, especially 2.5 to 15%, calculated as equivalent CaO. When the primary support is in a shape having a geometric surface greater than that of particles (such as a multi-tubular matrix or fibre), the proportion of alkaline earth oxide should be proportioned to the geometric surface. The concentration of alkaline earth metal (calculated as equivalent CaO, and including free and combined oxide) is suitably in the range 0.2–10, especially, 1 to 6, milligrams per square centimeter of geometrical surface; such values correspond to the above weight percentages when the geometrical area is 32 cm²/cm³.

When the secondary support has been applied as such or is the product of reacting its precursors at the primary support surface, the proportion of secondary to primary support is suitably in the range 2–40%, especially 5–25% by weight.

The primary support comprises an oxide such as magnesia, alumina, silica, titania, zirconia, hafnia, thoria, chromia and mixtures or compounds of these with each other or with basic refractory oxides such as those of calcium, strontium or barium, in highly refractory forms such as fused magnesia, highly calcined alumina, calcined aluminosilicates (especially cordierite), zirconmullite, spinels and hydraulic cements. Supports having specific surfaces in the range 0.1–100 m¹/g, such as alumina calcined at 950°–1500°C, alpha alumina bonded with bentonite and suitably calcined kaolin/cement mixtures are especially suitable.

Although it is generally preferable to choose a primary support material that will afford the best possible thermal and mechanical resistance, the invention includes catalyst supports and catalysts that, for operative convenience, have the same material, a calcium aluminosilicate, for both the primary and the secondary support and, indeed, some that do not include a secondary support introduced as a distinct component. It is believed to be legitimate to refer to the primary and the secondary support in such catalysts because catalytic chemical reaction appears to take place largely in surface regions of the catalyst less than about 30 microns deep, so that the inner region of the catalyst fulfils only the function of a primary support. Gehlenite and compounds isomorphous therewith are especially suitable when the same compound is to act as both the primary and the secondary support.

On cordierite, which has the empirical formula $Mg_2Al_4Si_5O_{28}$ and in which possibly some or all of the magnesium may be replaced by iron and/or manganese, good adhesion of calcium aluminosilicate secondary supports is obtained, and gehlenite is formed by the reaction of calcium compounds applied to the surface. Other suitable primary support materials include petalite, silicon nitride and silicon oxynitride.

One of the best supports that has been developed according to the invention comprises a cordierite primary support in the form of a multi-tubular matrix having 40 to 500 passages per square inch separated by walls of thickness 0.1 to 0.4 mm and a secondary support forming a layer on the surface of the primary support, the secondary support constituting 2–40% by weight of the primary support and consisting essentially of gehlenite.

When the primary support is a matrix made of bonded refractory fibres it can be in any form, for example, a set of refractory paper sheets supported in a suitable block or framework, or a block of fibres having sufficient permeability to allow gas to pass through or having through-passages. The fibres can be made of any material having suitable mechanical properties, for example, of alumina, silica, aluminosilicate, glass wool, chromia, titania or sirconia. Fibres composed substantially of alumina and/or zirconia of thickness under 10 microns and substantially free of particles known as "shot" are very suitable; and these may be made by fiberising a viscous composition comprising an aqueous solution of a salt of aluminium and/or zirconium and a water-soluble organic polymer, drying the fibre formed, and heating to decompose the salt to oxide and to decompose the polymer, especially as described in our UK patent application Nos. 29909/70-4369/71, published as Netherlands application No. 7108399, of which the specification is incorporated herein by reference. The refractory bonding of the fibres can be by for example any of the compounds of which the fibres could be composed and these can be applied in the form of colloidal solutions, aqueous solutions of thermally decomposable compounds or organic thermally decomposable compounds.

The invention provides methods of making the catalyst support.

One method comprises making a suspension of finely divided secondary support material in a liquid and applying the suspension to the surface of the primary support. The suspension may contain adjuvants such as soluble polymers or surface active agents to improve its stability and promote temporary adhesion. Usually adhesion can be improved by subsequent heat treatment at, for example, at least 800°C, especially 900–1200°C. These temperatures apply especially to calcium aluminosilicate systems. Suitable temperatures for other systems can, of course, be obtained experimentally.

A second method comprises applying to the primary support a solution or suspension of secondary support precursors, that is, compounds reactable together to produce the secondary support. A heat treatment is desirable to effect the reaction and cause adhesion.

Either of these methods is preferred for the supports specifically defined above.

A third method comprises selecting a primary support comprising at least one of the oxides to be combined in the secondary support, applying the other oxides to be combined therein and causing reaction to produce the secondary support at the surface of the primary support. A heat treatment as in the second method is desirable. Preferably the primary support comprises acidic and/or amphoteric oxides and a basic oxide is applied to it.

When the applied oxide is an alkaline earth oxide, the primary support is impregnated conveniently with the nitrate, but other suitable decomposable salts are the nitrate, bicarbonate, carboxylate(such as formate, acetate or citrate). Hydroxides are suitable and also silicates, aluminates and aluminosilicates provided they are adequately dispersed to make up for their low solubility. Insoluble compounds can be used as a slurry alone or in conjunction with soluble compounds. Hydrolyzable compounds such as halides can be used, but have the disadvantage of requiring prolonged steam treatment in order to produce oxide hydrolytically under readily accessible conditions. Any convenient method, for example, dipping or spraying, can be used for applying the secondary support material or precursor to the primary support.

After applying the alkaline earth compound, it is suitably dried, e.g. at 120°C, before the calcination. Calcination is preferably at a temperature in the range 600°–1400°C, especially 800°–1200°C, so as to give an oxide layer and/or to effect combination with the primary support.

In these three methods a primary support having the desired shape is used as starting material. A fourth method, however, comprises forming a calcium aluminosilicate or precursors thereof in the shape required. As explained, the secondary support is constituted by the surface layers of such a shape.

Whichever method is used, it is preferred to effect the heat treatment at over 800°C, especially 1000°–1600°C. Preferably it is carried out in the presence of steam, since this accelerates the reactions causing adhesion or producing the secondary support.

The invention provides a catalyst in which the support carries one or more platinum group metals.

If the catalyst is for exhaust oxidation, the platinum group metal is preferably platinum or palladium, especially palladium. If it is for reduction, the metal is preferably a combination of platinum or palladium with rhodium; other useful metals for reduction are ruthenium, iridium and mixtures thereof. The concentration of platinum group metal is, for oxidative or reductive treatment, suitably in the range 0.001 to 5%, especially 0.005 to 0.5% by weight, calculated as equivalent (i.e., equiatomic) palladium metal, of the constituents of the catalyst non-volatile at 900°C. When the support has a geometrical area of 32 cm$^2$/cm$^3$, these weight percentages afford 0.0004 to 2.0 and 0.002 to 0.2 milligrams per square centimeter of metal. Such a geometrical area can be obtained when the catalyst support is a multi-tubular matrix.

The catalyst can be made for example by impregnating the combined primary and secondary support with a solution of a compound thermally decomposable to a catalytically active material; optionally the product may be then heated to effect the thermal decomposition and treated to reduce the product of such decomposition of metal. In this method the catalytic material should preferably be confined as much as possible to the secondary support and the impregnation conditions chosen accordingly, for example, by control of the volume of the impregnating solution. In the impregnation with a compound of a platinum group metal a salt or an ionic or non-ionic complex can be used. Complexes such as ammines are useful owing to their resistance to hydrolysis. Impregnation may be in conjunction with a treatment with an organic acid or with an insolubilizing step such as reduction or sulphiding.

In another method catalytic material and/or precursors thereof and secondary support material and/or precursors thereof are mixed and applied to a primary support and the product is heated and, if required, reduced.

Any convenient method, for example dipping or spraying, can be used for the above impregnation or application.

Heating temperatures are as described in relation to making the support if the method includes the production of the secondary support or causing adhesion to the primary support. For the thermal decomposition to catalytically active material a temperature in the range 300°–800°C is suitable.

Reduction is required if the catalyst is to be used for a reductive treatment of exhaust gases, but is not usually carried out by the catalyst-maker, since it takes place in contact with the exhaust gas. Reduction followed by re-oxidation can be employed in making a catalyst for oxidation.

The product ("catalyst precursor") ready for charging to a reductive exhaust gas reactor but possibly requiring reduction therein is the usual article of commerce.

The invention provides a process of exhaust gas treatment using the catalyst. This may be reductive for the removal of nitrogen oxides or oxidative for removal of carbon monoxide and hydrocarbons. A reductive stage may be followed by air-addition and an oxidative stage. In some circumstances, depending on engine design and local emission standards, it is possible to use a single catalyst, of the type described herein, for removing nitrogen oxides, carbon monoxide and hydrocarbons simultaneously from an exhaust gas containing, possibly as the result of continuous air-addition, reductive and oxidative components in approximate equivalence. Whenever the process removes nitrogen oxides, the exhaust gas is preferably passed over a pre-oxidation bed in order to remove residual oxygen.

The process of NO$_x$ reduction is preferably started up in the presence of added air until the catalyst operating temperature has been reached.

When the process of the invention is to be used for nitrogen oxides removal The process of NO$_x$ reduction is preferably started up in the presence of added air until the catalyst operating temperature has been reached.

When the process of the invention is to be used for nitrogen oxides removal the reducing power of the gases as expressed by the function
$$CO + H_2 - 2O_2$$
where "CO," and "H$_2$" and "O$_2$" are volume percentages, is preferably positive and up to 6; a reducing power greater than 8 corresponds to poor fuel economy, CO being over 2% and O$_2$ under 0.3%. The carbon monoxide content of the gases need not, in general, be over 2%, and, indeed, engines designed to use a stoichiometric or slightly "lean" fuel mixture can be made non-polluting by the process of the invention. Further, the process affords effective removal of nitrogen oxides in systems in which air is added as a regular measure or for warming up.

The temperature for the process, whether reductive or neutral, is normally over 300°C, preferably in the range 500°–700°C. These temperatures relate to steady running conditions, not involving start-up or heavy accelerations, corresponding to the "stabilized mode" of the test as laid down in the U.S. Federal Register 36 No 128, July 2, 1971. In air-assisted warm-up or heavy acceleration the temperature can rise 150°–200°C above the steady running level.

If the exhaust treatment process is an oxidation, it is carried out suitably at temperatures in the range 200°–1000°C. When it is intended for complete oxidation of exhaust gases, whether as the sole catalytic treatment applied to such gases, or as an oxidation following nitrogen oxides removal under net-reducing conditions, the temperature is typically 400°–850°C and rises in the direction of gas flow, owing to the heat of reaction. For complete oxidation the rate of oxygen feed (usually as air) should be sufficient to oxidize all the carbon monoxide and hydrocarbon present and afford a moderate excess for example up to 2% v/v. It can, however, be used for incomplete oxidation, using a deficiency of oxygen and operating at a lower temperature. One example of such a use is in the preliminary removal of oxygen from a net-reducing exhaust gas, as a preliminary to treatment over a nitrogen oxides removal catalyst, as described in our copending UK patent application No. 13722/71, published as German patent application No. 2222467.

The space velocity of the process depends on the shape of the catalyst, but is typically (for granular or matrix catalyst) in the range 0.10 to 3.0 × 10⁵ hour⁻¹ for separate reduction or oxidation or combined reduction and oxidation and 2-5 times this range for an oxidation preliminary to nitrogen oxides removal, if such a bed is used. It will be appreciated that when the engine drives a vehicle the space velocity is likely to range between lower and upper levels differing by a factor of as much as 10, more probably up to 6.0, in town conditions in which the rate of engine revolution is compensated by gear-changing. The volume of catalyst should be ample for the very high gas-flows during accelerating-away in town traffic. The space velocity definition is to be understood as denoting a range $SV_1$ to $SV_2$ is from 6 to 10 times $SV_1$ within the stated broad range. Such space velocities correspond to catalyst volumes that are convenient for automobile use, for example 0.5 to 5.0 liters, according to engine size and characteristics.

The process using a catalyst on the support specifically defined above is especially preferred.

The invention provides further a reactor containing the catalyst and having an inlet port suitable for connection to an engine and an outlet port; and also an internal combustion engine having one or more such reactors in its exhaust line.

The gasoline fed to the engine suitably has a sulphur content of less than 200 ppm w/w (as S) and less than 0.4 g of lead (as Pb) per US gallon (3.8 liters), preferably under 0.01 g. The phosphorus content of the gasoline can be up to 500 ppm without significant detriment, using suitably chosen catalytically active materials.

The following Examples relate to laboratory tests, some with an engine, in conditions found to be correlated with U.S. Federal test procedures, as described in the above-cited issue of the U.S. Federal Register.

Where catalyst activity is expressed in terms of a first order velocity constant $k_{N_2} \sec^{-1}$, this has been calculated by the formula $$k_{N_2} = \frac{2.3\ SV}{3600} \log_{10} \frac{1}{1-0.01C}$$

where SV is volume hourly space velocity
C is percentage conversion of $NO_x$ to $N_2$.

EXAMPLE 1

Palladium-gehlenite-alumina catalysts

Four catalysts comprising palladium and having as primary support an extruded matrix or extruded cylinders, made of bentonite-bound alumina of composition 95% $Al_2O_3$, 5% $SiO_2$ and specific surface 0.3 m²/g were made by the following methods:

A. A 1-inch cube matrix block of bulk density 1.1 to 1.4 and having 512 passages per square inch separated by walls 0.25 mm thick (total area 32 cm²/cm³) was, in order to apply a secondary support, dipped in saturated calcium nitrate solution, drained, heated at 100°C for 4 hours; and this operation was repeated. The CaO content of the block was 8% by weight, corresponding to 3.25 mg/cm² of geometric surface. Material (secondary support) was scraped from the surface and examined by X ray diffraction and found to contain gehlenite as the predominant calcium-containing phase. The coated block was dipped into a 0.8% solution of palladium nitrate containing 0.2 ml of 60% nitric acid per 100 ml of solution, drained and dried.

B. A similar block was dipped into a suspension of colloid milled alumina, drained, dried at 120°C, heated at 650°C for 4 hours; and this operation was repeated. The coated block, having alumina as secondary support, was impregnated from a 3.2% aqueous solution of palladium nitrate containing 0.2 ml of 60% nitric acid per 100 ml of solution, drained and dried.

C. In order to make a catalyst having no secondary support a similar block was dipped uncoated into a 0.16% solution of palladium nitrate containing 0.2 ml of 60% nitric acid per 100 ml of solution, then drained, reduced with dilute hydrazine solution, drained, rinsed and dried.

D. Extruded cylinders of the same material as the matrix blocks were coated twice with calcium oxide by the method described for catalyst A, with calcination at 1050°C, then impregnated with a 0.42% palladium nitrate solution containing 0.2 ml of 60% nitric acid per 100 ml of solution, drained reduced with hydrazine, rinsed and dried. Again material scraped from the surface was examined by X-ray diffraction and found to contain gehlenite as predominant calcium-containing phase.

Test in oxidation process

The catalysts were tested by passing over them a gas of composition $CH_4$ 0.3–0.4%, $H_2$ 1%, CO 2.5–3.0%, $O_2$ 3.5–4.0%, $CO_2$ 15%, $H_2O$ 15%, $N_2$ balance, at a space velocity of 40,000 hour⁻¹. Operating at first at an inlet temperature of 700°C, the outlet CO content was measured. Then the inlet temperature was raised to 800°C for a period as shown in Table I, to subject the catalyst to accelerated ageing. Then the inlet temperature was decreased to 700°C, the measurements repeated, and the temperature again raised to 800°C for further ageing. This procedure was repeated up to a maximum of 450 hours.

TABLE 1

| | CO removal | | | | | |
|---|---|---|---|---|---|---|
| Hours of use | 0 | 25 | 50 | 74 | 202 | 450 |
| Catalyst A(0.15% Pd) | 95 | 95 | — | — | 99 | — |
| Catalyst B(0.23% Pd) | 98 | 92 | — | 51 | — | — |
| Catalyst C(0.01% Pd) | 97 | 21 | — | — | — | — |
| Catalyst D(0.08% Pd) | 99 | — | 99 | — | — | 97 |

It is evident that catalyst C absorbed very little palladium and, despite an initially high activity for CO oxidation, rapidly loses activity; Catalyst B, having colloidal high-area alumina on the surface of the matrix block, maintains its activity rather better than C. Catalysts A and D, which are substantially the same apart from their difference in geometrical shape, maintain their CO oxidation activity very well.

EXAMPLE 2

Platinum gehlenite-cordierite catalyst

Support

A cordierite matrix primary support 4 inches in diameter and 3 inches long supplied by Corning Glass Works and having 196 square-section passages per square inch separated by walls of thickness 0.3 mm was coated with gehlenite as secondary support by dipping three times into a colloid-milled gehlenite slurry. After each dip the coated matrix was dried at 120°C and calcined at 1100°C for 1 hour. The weight percentage of gehlenite applied was 8.0.

The gehlenite had been made by heating at 1220°C for 12 hours a pugged and extruded wet mixture of the following:
  992 g alpha alumina
  2144 g heavy precipitated calcium carbonate
  864 g bentonite
  600 g pre-cooked starch sold under the name "Kordek."

The resulting product was ground finely dry and then ball-milled overnight in water; the solid in the slurry was collected on a filter, then redispersed in water.

Catalyst

The support was immersed for 30 seconds in a solution, at pH 7, of an ammonia complex derived from chloroplatinic acid, at a concentration calculated to apply 0.2% w/w of platinum. It was then drained and dried.

Test in exhaust gas oxidation

The exhaust from a Ford Cortina 1600 cc engine, running at about 3100 rpm under a dynamometer load corresponding to 50 mph road load conditions and consuming 99 octane fuel containing 54 ppm w/w of sulphur but no lead or phosphorus, was passed over a catalyst to decompose nitrogen oxides to nitrogen. About 17% v/v of air was fed into the treated gas and the mixture was passed over the platinum catalyst at an inlet temperature of 600°C and a space velocity of $3 \times 10^5$. The gases entering and leaving the catalyst were analysed for hydrocarbons, and carbon monoxide. The engine carburetor setting was for most of the time such as to provide a carbon monoxide content of 2.0%, but it was changed temporarily to give 1.5% of carbon monoxide in order to permit the activity of the catalyst at this lower level to be measured.

The test was continued for 429 hours. The percentage conversions of carbon monoxide and hydrocarbon are shown in Table 2.

TABLE 2

| | Percentage conversions | | | |
|---|---|---|---|---|
| | inlet CO 2% | | inlet CO 1.5% | |
| Time, hours | CO | hydrocarbon | CO | hydrocarbon |
| 30 | 87 | 54 | 88 | 50 |
| 46 | 85 | 52 | 86 | 50 |
| 98 | 73 | 52 | 79 | 45 |
| 136 | 68 | 53 | 71 | 55 |
| 330 | 65 | NA | 67 | NA |
| 429 | 55 | 45 | 52 | 40 |

It is evident that the percentage conversion is maintained well and would be expected to be adequate for automobile use, in which the space velocity would be lower.

EXAMPLE 3

Platinum-rhodium-gehlenite catalyst.

A support was made as described in Example 2 and immersed in a solution of ammine complexes of platinum and rhodium chlorides at concentrations calculated to apply 0.07% of platinum and 0.03% of rhodium.

Test in net-reductive treatment of exhaust gases

There was passed over the catalyst at 700°C the exhaust from the engine described in Example 2. The gas entering the catalyst contained 2000–2500 ppm v/v of $NO_x$. The engine carburetter adjustment was varied to give various levels of reducing power in the gas. The space velocity was $1.4 \times 10^5$ hour$^{-1}$. The activity of the catalyst was determined at intervals by measuring the inlet concentration of $NO_x$ and the outlet concentrations of $NO_x$ and ammonia, and expressing the results as velocity constants $k_{N_2}$.

Table 3 shows the dependence of $NO_x$ removal activity with reducing power and its variation with time. By a graph of $k_{N_2}$ against reducing power level it was shown that the value of about 1.2 corresponds to the highest percentage conversion; and that substantial conversions could be obtained in approximately stoichiometric conditions.

TABLE 3

| | | $k_{N_2}$ sec$^{-1}$ | |
|---|---|---|---|
| Time, hours | CO+H$_2$−2O$_2$=1.9 | CO+H$_2$−2O$_2$=1.2 | CO+H$_2$−2O$_2$=0.7 |
| 3 | 87 | 82 | 70 |
| 26.5 | 50 | 58 | 43 |
| 45.4 | 40 | 41 | 41 |
| 73.4 | 27 | 44 | NA |
| 98.1 | 30 | 38 | 30 |

It is evident that the activity declines at first but settles out at a practically usable level.

EXAMPLE 4

Other catalyst supports according to the invention that were made were the following:

a. an extruded matrix composed of gehlenite as major phase and having 512 passages per square inch separated by walls 0.25 mm thick;

b. an extruded matrix 4 inches in diameter composed of gehlenite as major phase and having 288 right-triangular passages per square inch, separated by walls 0.3 mm thick;

c. a gehlenite-coated spiral cordierite matrix having 12 passages per linear inch, each passage having the cross-sectional shape bounded by a sine-wave and an arc. The gehlenite content was 6.5%.

d. a matrix as in (c) but coated with gehlenite formed in situ by impregnating twice with calcium nitrate and then calcining at 1000°C after each impregnation.

e. a synthetically produced cordierite matrix, ca. 300 passages per square inch each in the cross-sectional shape of the figure bounded by a sine-wave and a straight line, was coated with gehlenite by two impregnations with a gehlenite slurry, each followed by calcination at 1200°C. The gehlenite content was 12.7% w/w.

f. a cylindrical matrix consisting of bonded alumina fibres, supplied by Société Général des Produits Réfractaires under the name "Fiberal" and having a diameter of 8 cm, an axial length of 3.4 cm and 105 passages 1.5 mm wide per 25 mm square, was soaked in water and then drained and coated with gehlenite from a 16% w/w slurry. It was dried and then calcined at 1200°C for 1 hour. This procedure was repeated. The uptake of gehlenite was 13.6% w/w.

These supports were all suitable for conversion to exhaust treatment catalyst by impregnation with a solution containing compounds of one or more platinum group metals, analogously to what is described in Examples 1 to 3.

I claim:

1. A support for a catalyst for treating internal combustion engine exhaust gases which comprises a primary catalyst support carrying a refractory secondary catalyst support, the secondary support consisting essentially of one or more involatile acidic and/or amphoteric oxides selected from the group consisting of alumina, silica, chromia, manganese oxide, iron oxide and mixtures or compounds thereof substantially in combination with one or more basic oxides selected from the group consisting of calcium, strontium and barium.

2. A support according to claim 1 in which the acidic oxide is an aluminosilicate.

3. A support according to claim 1 in which the secondary support comprises gehlenite or a compound isomorphous therewith.

4. A support according to claim 1 in which the secondary support is a naturally occurring oxide, a man-made oxide or an oxide which is the in situ reaction product of precursors thereof.

5. A support according to claim 4 in which the secondary support is in the in situ reaction product of said basic oxide with said acidic and/or amphoteric oxides in the primary support.

6. A support according to claim 1 in which the primary support and the secondary support consist essentially of calcium aluminosilicate and the function of the primary support is performed by the inner regions of the support and the function of the secondary support is performed by the surface regions thereof.

7. A support according to claim 1 in which the primary support is cordierite.

8. A support according to claim 1 in the shape of a multi-tubular matrix.

9. A catalyst support comprising a cordierite primary support in the form of a multi-tubular matrix having 40 to 500 passages per square inch separated by walls of thickness 0.1 to 0.4 mm, and a secondary support forming a layer on the surface of the primary support, the secondary support constituting 2–40% by weight of the primary support and consisting essentially of gehlenite.

10. A catalyst for the treatment of internal combustion engine exhaust gases on a support according to claim 1 and in which the catalytically active material is selected from the platinum group metals.

11. A catalyst according to claim 10 in which concentration of platinum group metal is in the range 0.005 to 0.5% by weight, calculated as equiatomic palladium metal.

12. A catalyst according to claim 10 in which the active metal is platinum or palladium, the catalyst being intended for exhaust gas oxidation.

13. A catalyst according to claim 10 in which the active metal is a combination of platinum and rhodium, the catalyst being intended for reductive treatment of exhaust gas.

* * * * *